April 28, 1964 T. H. MILBOURN 3,130,792
ROOT CROP HARVESTER
Filed March 27, 1962 5 Sheets-Sheet 1
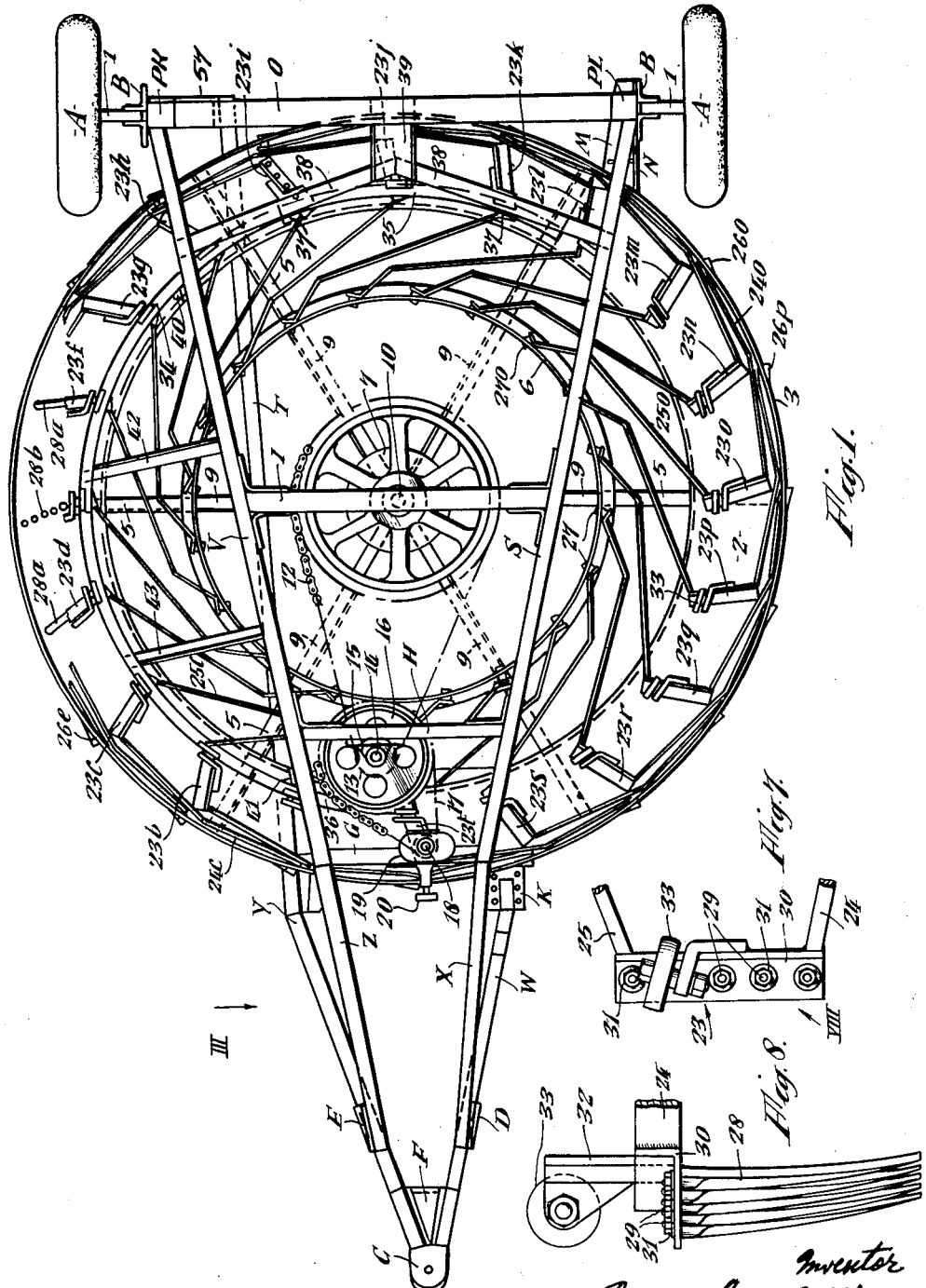

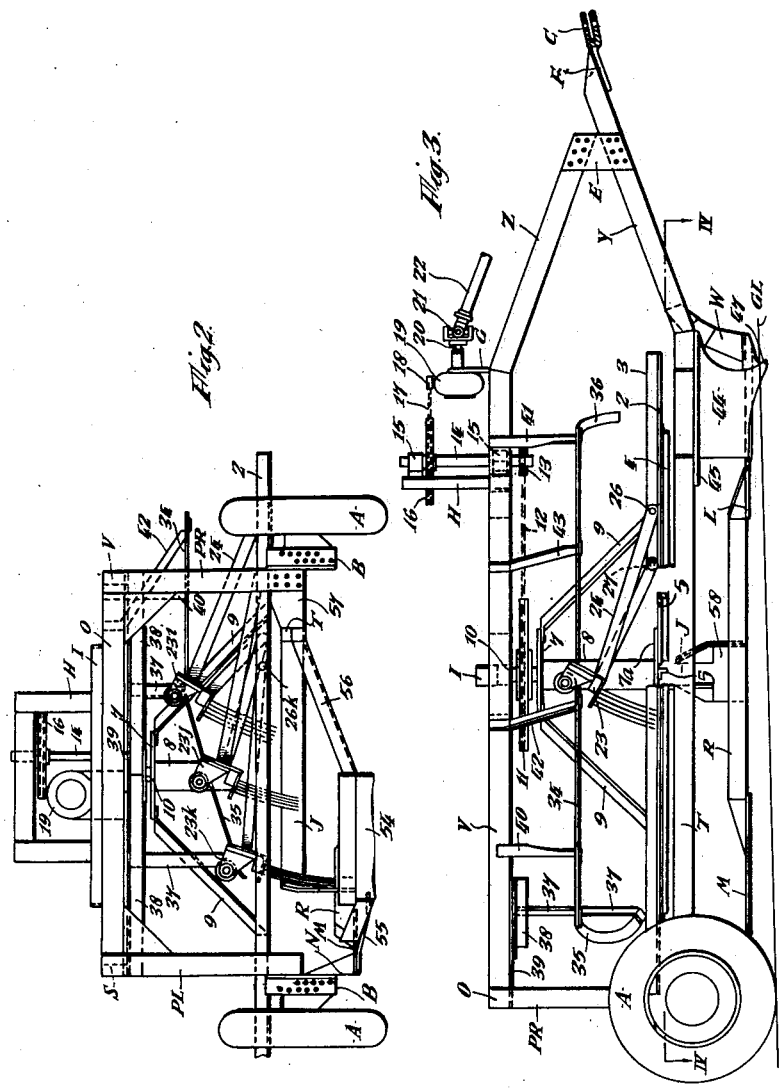

April 28, 1964  T. H. MILBOURN  3,130,792
ROOT CROP HARVESTER
Filed March 27, 1962  5 Sheets-Sheet 3
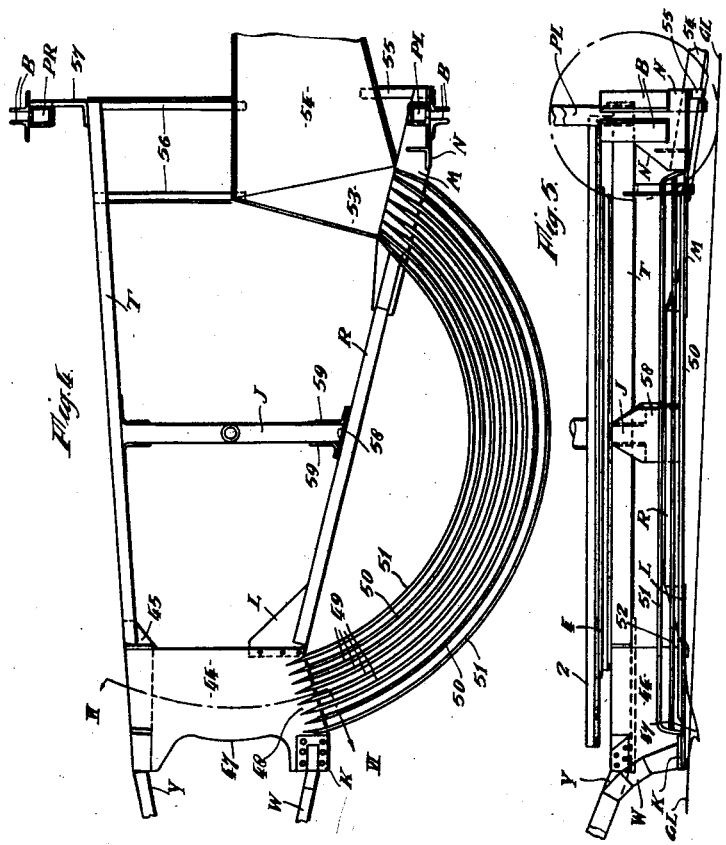

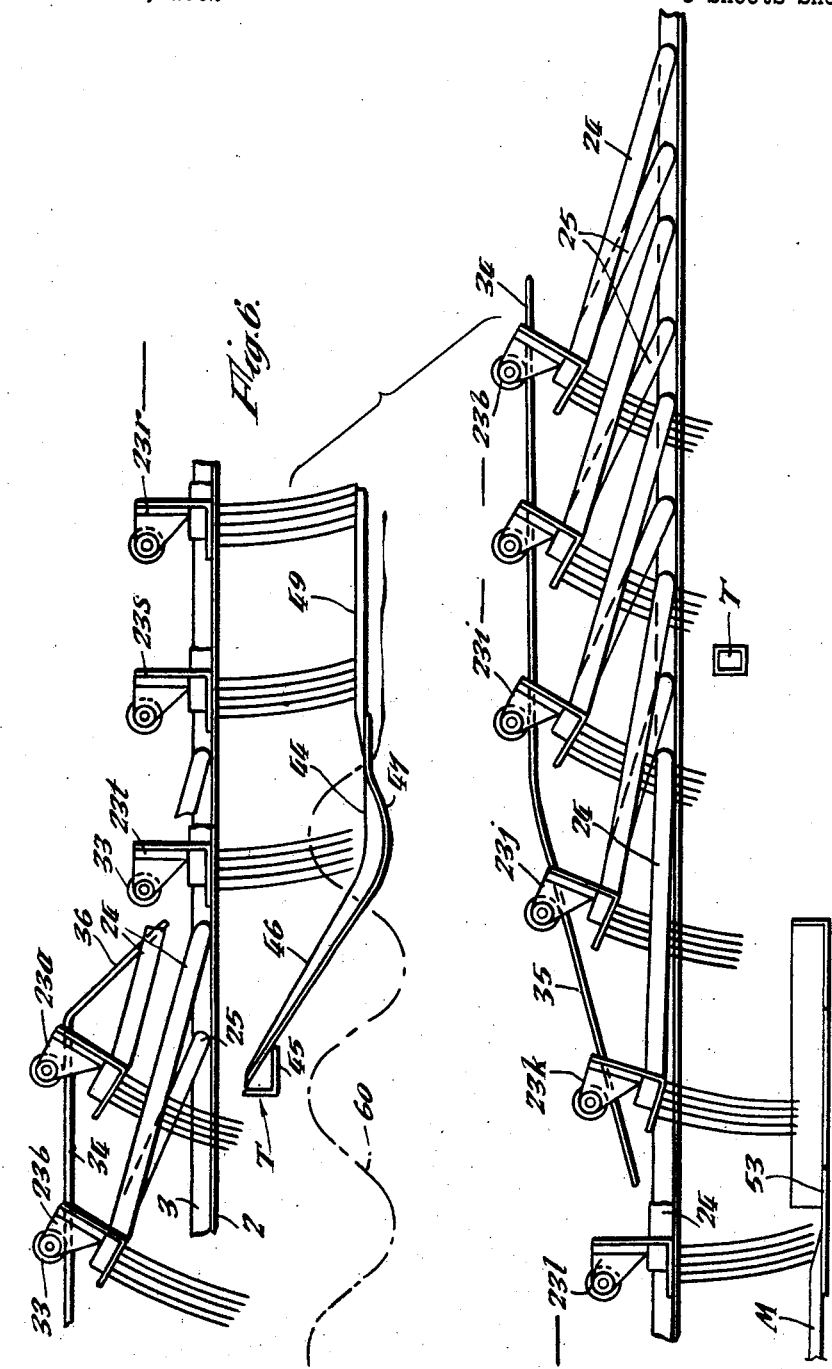

April 28, 1964 T. H. MILBOURN 3,130,792
ROOT CROP HARVESTER
Filed March 27, 1962 5 Sheets-Sheet 5
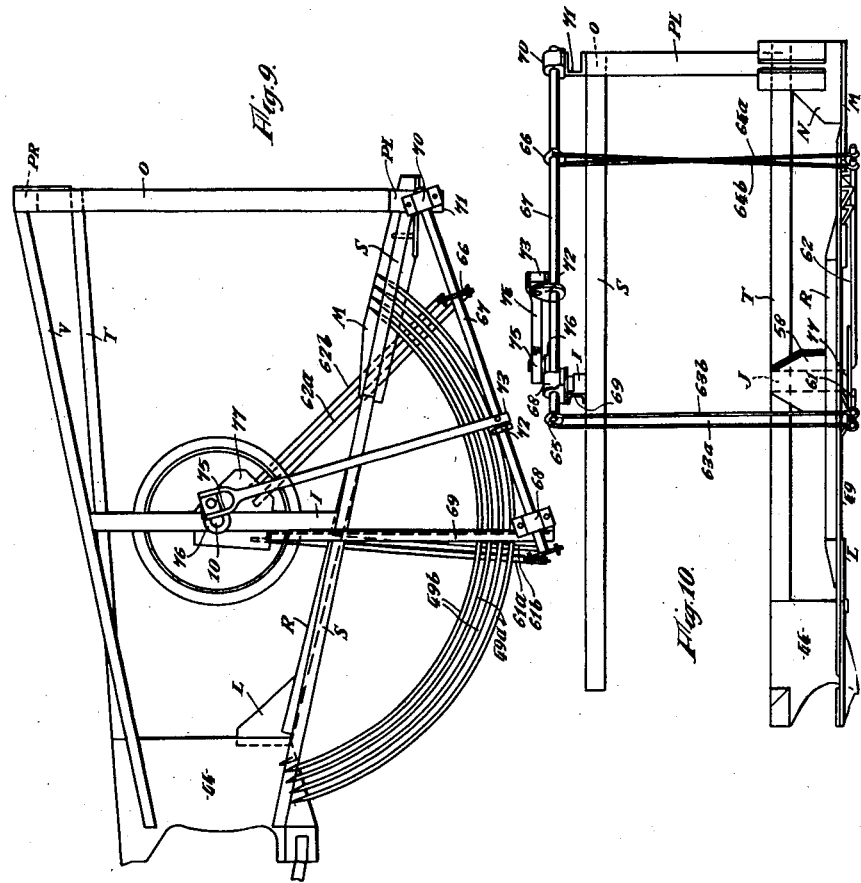

United States Patent Office 3,130,792
Patented Apr. 28, 1964

3,130,792
ROOT CROP HARVESTER
Thomas Henry Milbourn, Brunstock House, Brunstock, Carlisle, Cumberland, England
Filed Mar. 27, 1962, Ser. No. 182,816
13 Claims. (Cl. 171—115)

This invention relates to a harvester to be drawn by a tractor for lifting root crops, more particularly for potatoes, and has for an object to provide an improved harvester capable of cleaning the tubers and delivering them to collecting means substantially freed from soil and other vegetable matter.

The invention provides a root crop harvester comprising a rotary member, an annular series of fork assemblies mounted on said rotary member with depending tines substantially in radial planes, a spindle supporting said rotary member, and a forwardly-directed digging scoop. At least one lateral portion of said scoop which is traversed by the fork elements as they leave the scoop is continued as a substantially semi-circular channel having a base of rods or bars radially spaced to be penetrable by the tines of said fork elements. A discharge chute is located at the rearward end of said channel. Said spindle, scoop and chute are mounted on a frame provided with a towing link, namely a tow bar or tractor hitch. Non-rotary cam means are located coaxially with said rotary member and cam-follower means are associated with each of said fork assemblies whereby the tines of said elements are caused in succession, as each in its annular path leaves the scoop, first to cooperate with said rods or bars, then to rise while passing over said chute and to remain raised until their lower ends are above the upper limit of the other lateral or entry portion of the scoop, and finally to descend over said other lateral portion.

Said other lateral portion or entry portion of the scoop may be an oblique portion of a suitably formed plate. The rods or bars of said substantially semi-circular channel may be attached by their ends to the surface of said plate at the side thereof opposite said oblique portion.

The semi-circular rods or bars may be mounted to be capable of oscillation up and down, preferably in two sets each comprising alternate bars. Each set may be mounted on two radial arms, the four arms thus provided being mounted in two parallel pairs articulated to the frame adjacent said spindle and extending substantially radially therefrom. Means such as two pivoted two-armed levers are provided at suitable locations, with links depending from the ends of said arms to the outer ends of each pair of radial arms so that as one arm is raised the other is depressed. The two pairs of arms may be located one at somewhat less than 90° and the other at somewhat less than 180° from the scoop, the ends of the semi-circular rods remote from said scoop being unsupported except by the latter pair of arms. Said levers may be mounted on a shaft tangential to the axis of the rotary member, with said links depending adjacent and beyond the periphery of said member, and with suitable means for oscillating said shaft in unison with the rotation of said rotary member.

An embodiment of my invention, and a modification will be described, by way of example, with reference to the accompanying diagrammatic drawings, wherein:

FIG. 1 is a plan view of a root crop harvester,

FIG. 2 is a rear end elevation,

FIG. 3 is a side view, as seen in the direction of arrow III, FIG. 1,

FIG. 4 is a horizontal section on the line IV—IV of FIG. 3,

FIG. 5 is a fragmentary side view corresponding to FIG. 4,

FIG. 6 and FIG. 6 continued show in rectilinear extension certain components which are located on a circle indicated by the arc VI—VI of FIG. 4, FIGS. 7 and 8 are respectively a plan view and an elevation, on a larger scale, of a fork assembly, FIG. 9 is a fragmentary plan view showing a shaker means for the base bars of said channel, and FIG. 10 is a corresponding side view.

The root harvester as shown in the drawings is mounted in a structure comprising upper and lower trapezoidal frames connected together at their front and rear ends. The upper frame as more clearly seen in FIG. 1 comprises convergent longitudinal members V, S, connected together at their forward ends by a cross bar G, at their rear ends by a transverse beam O, and intermediately by an upstanding frame H and a transverse beam I. The lower frame more clearly shown in FIG. 4 comprises forwardly convergent longitudinal members T, R connected together by a transverse beam J immediately below the beam I, and otherwise interconnected as will later be described.

The forward ends of the lower beams T and R are connected to upwardly extending and forwardly convergent members Y, W, which are connected together by a transverse plate F and thereby also connected to a towing eye C. The forward ends of the upper members V and S are extended by downwardly convergent members Z, X respectively which are connected to the members Y, W, by gusset plates E, D.

For a purpose which will be described the towing eye C is set off left of centre of the machine, with respect to which the upper frame members V, S are symmetrical.

At their rear ends the upper and lower frames are mainly interconnected by vertical posts PL, PR. At the base of each of these posts is located a pair of opposed, vertical angle elements B, the elements of each pair having between them a space in which is secured a vertically adjustable member 1 comprising a stub axle on which is freely rotatable a ground wheel A.

Mounted on a vertical axis between the transverse beams I and J is a rotary assembly including a horizontal annular plate 2, which is reinforced at its outer edge by an upstanding flange 3 and beneath its inner margin by an angle ring 4. This annular plate is carried by six radial arms 5 (FIG. 1). Inwardly spaced from the inner margin of the plate 2 the arms 5 also support an angle ring 6. The hub of the assembly comprises a pair of discs 7, 7a spaced apart by a tube 8. The inner ends of the arms 5 are attached to the lower disc 7a (FIG. 3) and from adjacent the angle ring 6 oblique braces 9 extend from each of said arms to the upper one of the discs 7. Above said upper disc there is secured to a spindle 10 a large chain wheel 11, which is connected by a roller chain 12 to a sprocket 13 on a vertical shaft 14 supported in bearings 15 by the box frame H. Towards the upper end of the spindle 14 there is secured to it another chain wheel 16, which is connected by a chain 17 to a sprocket 18 mounted on a vertical output shaft of a speed reduction gear box 19 mounted on the crossbar G and having a forwardly directed input shaft 20 to which is coupled, by means of universal joint 21, a drive shaft 22 which can be connected to the power take-off of a tractor to which the towing eye C may be hitched. Thus as the apparatus is pulled by the tractor the rotary assembly is rotated at relatively slow angular speed. However, owing to the fact that the annular plate 2 has a large diameter (for example of the order of 9 feet) the peripheral speed of said plate is relatively high.

In association with the annular plate 2 there are mounted twenty equally spaced fork assemblies 23, individually designated by the suffixes a–t. The details of the assembly are more clearly shown in FIGS. 7–8. Each comprises five tines 28 having threaded spigots 29 which are passed through opposed holes in the horizontal web of an angle crossbar 30 and secured by nuts 31. Each crossbar is located above the plate 2 and as shown in FIG. 1 is inclined at a small angle to a radial plane through the axis of the shaft 10, the tines 28 depending through an inclined slot 28a or series of holes 28b in the plate 2. Each of the crossbars is welded to an outer arm 24 and an inner arm 25 as will be described by way of example with reference to the assembly 23o at the lower part of FIG. 1. The outer arm 24o is outwardly cranked to pass between the outer end of the crossbar of assembly 23n and a bush 26p for the outer arm of the assembly 23p, and the leading end of said arm 24o (the plate 2 being rotated anti-clockwise as seen in plan) is mounted in a bush 26o in the flange ring 3 on the plate 2. The inner arm 25o is likewise mounted in a bush 27o in the upstanding web of the angle ring 6. The mountings may comprise rubber bushed bearings, since as described the angular displacement is small, thus avoiding the need for lubrication at these points. As will be appreciated, it is necessary that the bushes 26o and 27o shall be in alignment, and parallel to the crossbar of the assembly 23o as illustrated. Extending upwards from each crossbar is an angle bracket 32 formed as shown to support with its axis radial to that of the vertical shaft 10 a cam follower roller 33 (preferably a lubricant packed and sealed anti-friction bearing). Each of these rollers is disposed to engage and follow the outer rim portion of a fixed, part-annular cam bar 34 which is partly horizontal with a rising leading end 35 and a descending trailing end 36.

As the annular plate is rotated the fork assemblies 23 are in succession lifted by said cam bar and subsequently permitted to fall and rest upon the annular plate 2. As will be understood by consideration of FIGS. 1 and 6, the fork assembly 23a, which is above the forward end of lower frame member T, is at the trailing end of the horizontal portion 34 of the cam bar and about to descend the trailing slope 36 thereof as the plate 2 rotates in a counter-clockwise direction. The preceding assembly 23t has by the movement of its roller 33 off the cam bar end 36 been deposited on the plate 2. The assemblies remain upon said plate 2 through the positions of assemblies 23s–23l, whereafter the follower rollers engage the rising portion 35 of the cam bar, which is so disposed that the assembly in the position 23i is raised sufficiently for the lower ends of its tines to clear the rear end of the lower frame member T. From this position back to the initial position of assembly 23a as described, the fork assemblies remain raised before again being lowered.

The cam bar is supported by various elements engaging beneath its inner margin so as to leave the upper surface unobstructed as a path for the rollers 33. As diagrammatically shown, from its rising end around to its descending end 36 said cam bar is supported successively by a pair of strip hangers 37 depending from horizontal angle members 38 which are supported at their outer ends respectively by the upper frame members T, S and at their inner ends by a bracket 39 welded to the transverse beam O; on the outer side of the frame member S rearwardly and forwardly by two twisted strip hangers 40, 41, and intermediately thereof by two inclined angle braces 42, 43.

The remainder of the construction will best be described with reference to the operation of the machine. The forward ends of the lower frame members T, R are connected together by a scoop 44 the shape of which will be understood from FIGS. 3–6. Where the scoop 44 is secured to the lower frame member T, the box form girder which constitutes said member is interrupted by a portion of triangular section including a base plate 45 which is extended and secured beneath the ends of the box form portions. The oblique surface of said triangular portion serves as a support for an oblique entry portion 46 of the scoop 44 descending to a middle portion which is substantially horizontal with a forwardly and downwardly directed digging lip 47. From the middle, the scoop extends substantially horizontally to the left hand side, where it is supported by and connects a horizontal plate K at the rear of lower left hand tow bar member W and a plate L welded beneath the forward end of lower left hand frame member R. At said left hand margin 48 of the scoop 44 there are attached to the upper surface of the plate tapered ends of four substantially semi-circular bars 49 spaced so as to be capable of penetration by the tines 28 of the fork assemblies. These bars extend arcuately around the left hand side of the machine beneath the corresponding portion of the annular plate 2, and their rearward ends are located upon or above the upper surface of a plate M which is welded beneath the rear end of said member R. The plate M is supported by a gusset N from the angle members B at the lower end of the post PL.

On either side of the group of bars 49 there is a co-axial marginal bar 50 constituting the base of a side wall, and above each of the bars 50, and displaced somewhat therefrom radially is an upper side wall bar 51. Between the bars 50 and 51 on each side there may be any suitable retaining means for harvested roots displaced around the channel by the fork tines; as shown in FIG. 5 there is an intermediate bar 52 located horizontally between the bars 50 and 51. To the inner margin of the plate M there is welded an entry plate 53 of a rearwardly and downwardly extending discharge chute 54, by way of which the harvested roots may be deposited. The chute 54 is supported by a tie 55 extending from the rear end of the plate M, and by a pair of ties 56 extending from the longitudinal frame member T.

Said frame member T has its rear end supported by a gusset 57 from the lower end of the right hand post PR, and supports the right hand end of the lower transverse beam J at substantially the same level. The left hand member of the lower frame, comprising the beam R with the plates L and M, is at a substantially lower level, and is connected to the left hand end of the beam J by an upstanding gusset plate 58 and a pair of angle gussets 59.

The purpose of this arrangement will be understood from a consideration of FIG. 6 with particular reference to the location of the lip 47 of the scoop 44. Plants of which the roots are to be harvested, particularly when these are potatoes, are ridged up as indicated by the chain dot line 60 and the apparatus will be so attached to the tractor that it is drawn over the ground with the scoop lip 47 cutting through the base of a ridge, so that the scoop passes beneath the roots of the plants; the effective ground line of the apparatus being indicated at GL—GL, in FIGS. 3 and 5.

As the right hand side of the harvester is passing over plants not yet harvested it is necessary that the frame member T and the fork tines shall be raised sufficiently to avoid disturbance of these plants, whereas the left hand side of the harvester extends over ground from which the roots have already been harvested and which has been substntially levelled so that the left hand side member of the lower frame, comprising beam R and plates L and M, can be very little raised from the ground. Further, the towing eye C is offset from the centre line of the frame to enable the right side wheels of the tractor to run in one of the furrows between a pair of ridges holding unharvested plants, and so that the tractor passes mainly over ground already cleared of the crop.

As the harvester progresses, the scoop 44 continuously digs up and loosens the soil of a ridge, and the roots contained therein, and is swept by a succession of forks which gather the roots and displace them laterally into the channel constituted by the bars 49—51. Around this they are swept in such manner as to be freed from earth and foliage and deposited in a comparatively clean condition in the chute 53.

In a modification of the apparatus the bars 49 as shown in FIGS. 9 and 10 (wherein the fixed lateral bars are omitted) may be mounted to be capable of oscillating up and down preferably in two sets 49a, 49b of each comprising alternate bars. While the forward ends of the bars remain welded to the leaving margin 48 of the scoop 44, their rear ends are not attached to the plate M, but are mounted on a pair of radial arms 62a, b which extend from a support plate 77 suitably supported beneath the transverse beam J adjacent the lower end of the spindle 10 of the rotary assembly. Similarly, the middle portions of the bars 49 are mounted on another pair of radial arms 61a, b extending substantially transversely from the same support plate 77. Said pairs of arms have their outer ends suspended by pairs of links 63a, b and 64a, b, the uper ends of each pair of said links being articulated to the arms of one of two double-ended levers 65, 66 mounted on one end of a shaft 67 supported tangentially to the rods 49. The forward end of shaft 67 is mounted in a bearing 68 carried by a beam 69 extending across the upper frame member S beside the transverse beam I, and the rear end of said shaft is mounted in a bearing 70 supported by a bracket 71 at the top of the post PL. Said shaft 67 has an upstanding crank arm 72 to which is articulated the outer end 73 of a link 74, the inner end 75 of which is articulated to a crank arm 76 mounted on an upward extension of the spindle 10 (or a vertical crank shaft geared to said upward extension so that said crank shaft is rotated at a higher speed). Thus, as the harvested roots are displaced along the channel by the forks, the base of which is constituted by the bars 49, through the oscillation of said shaft 67 and the links 63, 64 suspended from the levers 65, 66 on said shaft, the bars 49a are lifted while the other two bars 49b are depressed, and vice versa alternately in succession so that the roots are shaken and thus tend to be better cleaned from earth and foliage than is the case when the bars are fixed as described with reference to FIGS. 4 and 5.

If desired, the rods 49 forming the base of the delivery channel, whether fixed or oscillating, may rise gradually from their forward to their rearward ends, and the leading slope 35 of the cam bar 34 may be extended and made less steep so as to lift the fork assemblies correspondingly while their tines remain in intersection with said rods.

Haulms of the crop can be removed by any suitable means, which forms no part of this invention. The scoop thus picks up the roots with some earth, and these are displaced by the rotating forks into said semi-circular channel. In the arrangement shown in FIGS. 9 and 10, the sets of alternate rods forming the base of the channel are continuously oscillated in opposite directions by the lever-linkage means 63—66 connecting the shaft 67 and the outer ends of the arms 61, 62 which support the middles and rearward ends of said rods. Thus, as they are urged rearwardly by the forks, the tubers are agitated and freed from soil which is discharged downwardly between the rods and laterally through the grid-like walls of the channel, so that the tubers are delivered in a reasonably clean state to the chute 44 at the rear of the harvester, whereby they are deposited in suitable collecting means.

What I claim and desire to secure by Letters Patent is:

1. A root crop harvester comprising a rotary member, an annular series of fork assemblies mounted on said rotary member with depending tines substantially in radial planes, a spindle supporting said rotary member, a forwardly-directed digging scoop, at least one lateral portion of said scoop which is traversed by the fork elements as they leave the scoop being continued as a substantially semi-circular channel having a base of bars radially spaced to be penetrable by the tines of said fork elements, and a discharge chute at the rearward end of said channel, said spindle, scoop and chute being mounted on a frame provided with a towing link, and non-rotary cam means coaxial with said rotary member and cam follower means associated with each of said fork assemblies whereby the tines of said fork elements are caused in succession, as each in its annular path leaves the scoop, first to cooperate with said rods or bars, then to rise while passing over said chute and to remain raised until their lower ends are above the upper limit of the other lateral entry portion of the scoop, and finally to descend over said other lateral portion.

2. A root crop harvester according to claim 1, wherein the frame includes a longitudinal member supporting said one lateral leaving portion of the scoop at a lower level, and a longitudinal member supporting said other lateral or entry portion of the scoop at a higher level.

3. A root crop harvester according to claim 1, wherein the scoop is a suitably formed plate of which one lateral portion is a substantially horizontal margin and said other lateral entry portion is inclined downwards in the direction of movement of the fork tines.

4. A root crop harvester according to claim 3, wherein said bars are attached by their ends to the side of the scoop opposite said oblique portion.

5. A root crop harvester according to claim 1, wherein said fork assemblies each comprise a cross bar on which is mounted a cam follower roller to cooperate with a fixed arcuate cam bar, a plurality of tines depending from said crossbar, and a pair of links secured to the ends of said crossbar, whereby the assembly is trailed from said rotary member.

6. A root crop harvester according to claim 5, wherein said rotary member includes a circular plate having apertures penetrated by each of the sets of fork tines, said plate supporting the crossbar of each fork assembly when in its lowered position.

7. A root crop harvester according to claim 5, wherein at least the outer link of each fork assembly is so formed as to extend, when the assemblies are lowered upon said plate, between the outer end of the crossbar of the preceding assembly and the leading end of the outer link of the succeeding assembly.

8. A root crop harvester according to claim 5, wherein each fork assembly is so disposed that its outer tine is forward (in the direction of rotation) of its inner tine, the crossbar being inclined to a radial plane of the axis of rotation, and the pivotal bushes at the leading ends of the links being aligned on an axis parallel to said crossbar.

9. A root crop harvester according to claim 1, wherein the towing link is off-set from a longitudinal centre line of the scoop and the axis of said rotary member.

10. A root crop harvester according to claim 1, wherein the base bars of said channel are mounted to be capable of oscillation up and down, in two sets each comprising alternate bars.

11. A root crop harvester according to claim 10, wherein each set of said bars is mounted on two radial arms, the four arms thus provided being mounted in two parallel pairs articulated to the frame adjacent said spindle and extending substantially radially therefrom, two pivoted two-armed levers being provided at suitable locations, and links depending from the ends of the arms of said levers to the outer ends of each pair of said radial arms so that as one arm is raised the other is depressed.

12. A root crop harvester according to claim 11, wherein said two pairs of arms are located one at somewhat less than 90° and the other at somewhat less than 180° from the scoop, the ends of the semi-circular rods remote from said scoop being unsupported except by the latter pair of arms.

13. A root crop harvester according to claim 11, wherein said levers are mounted on a shaft tangential to the axis of the rotary member, with said links depending adjacent and beyond the periphery of said member, and with suitable means for oscillating said shaft in unison with the rotation of said rotary member.

References Cited in the file of this patent

UNITED STATES PATENTS

| | | |
|---|---|---|
| 18,899 | Hardenbergh | Dec. 22, 1857 |
| 207,175 | Green et al. | Aug. 20, 1878 |
| 1,711,990 | Coatsworth | May 7, 1929 |